(No Model.)
H. W. HILL.
FRICTION CLUTCH PULLEY.
No. 299,787. Patented June 3, 1884.
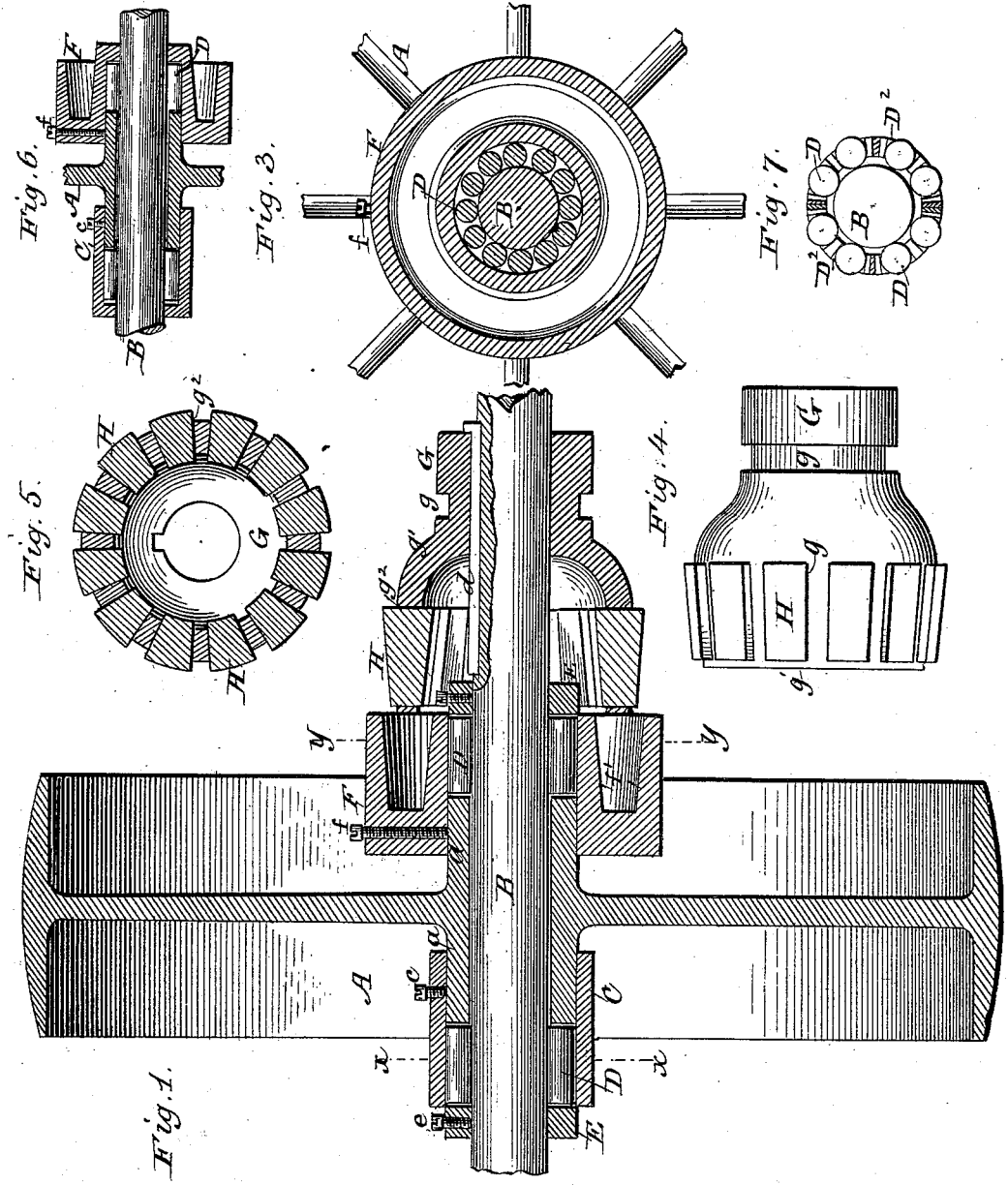
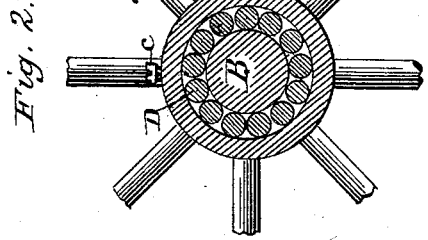
Witnesses:
L. C. Hills.
W. B. Masson
Inventor:
Harry W. Hill
by E. E. Masson
atty.

UNITED STATES PATENT OFFICE.

HARRY W. HILL, OF MONTGOMERY, ALABAMA.

FRICTION-CLUTCH PULLEY.

SPECIFICATION forming part of Letters Patent No. 299,787, dated June 3, 1884.

Application filed February 23, 1884. (No model.)

*To all whom it may concern:*

Be it known that I, HARRY WILLARD HILL, a citizen of the United States, residing at Montgomery, in the county of Montgomery and State of Alabama, have invented certain new and useful Improvements in Friction-Clutch Pulleys, of which the following is a specification, reference being had therein to the accompanying drawings.

In clutch-pulleys as heretofore constructed the hub of the loose pulley is generally longer upon the one side than upon the other, thus presenting a bearing-surface which fails to evenly or squarely support the pulley, from which it results that the latter becomes unbalanced, its eye unevenly worn, and, finally, its removal is required and the substitution of a new pulley, the remaining portions of the clutch usually being in good condition.

The object of my invention is to obviate these disadvantages and to provide a clutch-pulley which shall be evenly balanced and operated without undue friction of the moving parts. Further objects and advantages will appear in the following description of my invention, and the novel features thereof will be specifically set forth in the claims.

Referring to the drawings, Figure 1 is a central vertical longitudinal section of a clutch constructed in accordance with my invention. Fig. 2 is a vertical transverse section on the line $x\ x$ of Fig. 1. Fig. 3 is a similar section on the line $y\ y$ of Fig. 1. Fig. 4 is a side elevation, and Fig. 5 a transverse section, of the movable member of the clutch. Fig. 6 is a modification of the roller-retaining sleeve secured to the pulley-hub. Fig. 7 is a transverse section of the roller's carrying-cage.

A represents a driving-pulley, by which it is designed to give motion to a shaft, B, (or, vice versa, the pulley may receive its motion from the clutch upon the shaft.) The hub of the pulley is projected therefrom on each side to an equal distance, the extension of the projection being as desired and sufficient to retain the pulley at a right angle to the shaft. The hub is bored interiorly to loosely fit the shaft; but, if desired, it may be bored so that it shall not come in contact with the shaft. The exterior of the hub, as at $a$, is turned to a true cylinder, forming an exterior bearing-surface adapted to fit snugly in a sleeve, C, which is secured to the hub by one or more set-screws, $c$. Within this sleeve and bearing upon the shaft and upon the inner surfaces of the sleeve are friction-rollers D, the inner ends of which abut against the outer end of the hub of the pulleys A, and the outer ends of which abut against a collar, E, secured upon the shaft by a set-screw, $e$, or by any other suitable means. (Instead of the collar E made removable upon the shaft, a shoulder or a ring may be formed on or as a part of the shaft.) At the opposite end of the hub the equivalent means of the sleeve E for supporting the pulley A is placed—the receiving-member of the clutch proper—which is bored centrally to fit the hub exteriorly, and is secured thereto by means of one or more set-screws, $f$. Friction-rollers D are retained within this member, bearing upon its interior surface and upon the shaft, and abutting against the outer end of the hub and also against a second collar, E, in a similar manner to that hereinbefore described. The outer face of the clutch-member F is circumferentially grooved, the walls $f'$ of which converge slightly from the outer face of the member inwardly, whereby they are adapted to receive any suitable circular wedge or truncated cone, which is carried by the movable member of the clutch mechanism. In this instance the movable member G of the clutch comprises a collar circumferentially grooved, as at $g$, for the reception of any well-known operating-lever. A key or spline, $d$, set in the shaft B, fits in the collar of the member G, and serves to prevent the rotation of the collar upon the shaft, and at the same time permits longitudinal movement thereon. Secured to it and forming a part of the collar is a cup-shaped extension, $g'$, in which are formed square openings $g^2$, wherein blocks of wood H are inserted, the inner and outer faces of which blocks are beveled to agree with the walls $f'$ of the receiving-member F of the clutch.

This being the construction of my invention, the operation is as follows: The hub of the pulley being supported in the sleeve C at one end and by its equivalent, the central portion of the receiving-member F at the other end is free from contact with or may have the slightest possible bearing, friction, and wear upon the shaft B. The sleeves being supported on the shaft by the friction-rollers D, which are located upon either side of and at a distance from the center of the pulley, not only reduces the friction of the parts, but also presents greatly separated bearing-surfaces for the pulley, whereby it is less liable to get out of line and be unevenly worn by use. It is apparent that when the movable member G is by any suitable means thrown toward the member F, the wooden wedges enter the circumferentially-faced groove and produce frictional contact therein, and thus conveys the motion of the pulley to the shaft, or vice versa, and when withdrawn, as shown, the shaft and pulley are capable of independent rotation.

I do not wish to be understood as limiting myself to the use of the particular movable members of the clutch herein shown, in connection with the other novel features of my invention; nor do I wish to limit my invention to the exact proportion and details of construction herein shown, but reserve my right to change and alter the same in any manner and to any extent within the skill of persons conversant in the construction of similar devices. For example, the collar E and sleeve C and its equivalent may be formed in each case integrally, and as clearly indicated, the pulley may have bearing upon the shaft and within the sleeve simultaneously, if desired, and the friction-rollers D may be entirely dispensed with, and the collars E fitted for rotation upon the shaft; but in either case I prefer to use a series of rollers placed in a cage made of two segments, $D^2$, that can be easily removed from the interior of the sleeves when the friction-rollers become worn and the latter replaced by new rollers.

Having described my invention and its operation, what I claim is—

1. In combination with a shaft, a sleeve mounted loosely thereon, a pulley also mounted loosely upon the shaft, and a receiving-member of a clutch, said sleeve and said member being fitted concentrically to the hub of the pulley, substantially as specified.

2. The combination of a shaft, a pulley mounted loosely thereon, a sleeve, and a receiving-member of a clutch fitted exteriorly to the hub of a pulley, and a movable member of a clutch, substantially as specified.

3. The combination of the pulley A, having a hub exteriorly finished, as at $a\ a$, the sleeve C, secured thereon, friction-rollers D, collars E, and the member F, substantially as shown and described.

4. The receiving-member of a clutch, comprising a collar having a cup-shaped projection, $g'$, provided with wooden wedges located in and extending through the walls of the cup, substantially as specified.

5. The combination of the pulley A, sleeve C, collars E, member F, and movable member G, provided with wedges H, substantially as shown and described.

6. The combination of the pulley A, having hub exteriorly finished, as at $a\ a$, the sleeve C, secured to said hub-member F, segmental cages at both ends thereof, and friction-rollers D, within said cages, substantially as and for the purpose described.

In testimony whereof I affix my signature in presence of two witnesses.

HARRY W. HILL.

Witnesses:
 W. H. GESNER,
 CHAS. B. WILKINS.